United States Patent [19]

Yonezawa et al.

[11] Patent Number: 4,956,403

[45] Date of Patent: Sep. 11, 1990

[54] SUPPRESSION OF PRESSURE WATER ABSORPTION OF LIGHTWEIGHT AGGREGATE BY AQUEOUS DISPERSION THEREIN OF ANIONIC POLYMERS

[75] Inventors: Toshio Yonezawa, Tokyo; Takashi Iwashimizu, Osaka; Yasuhiko Yoshioka; Koichi Ito, both of Tokyo; Kunio Sakaue; Tetsuo Nakase, both of Kyoto, all of Japan

[73] Assignees: Takenaka Komuten Co., Ltd., Osaka; Sanyo Chemical Industries, Ltd., Kyoto, both of Japan

[21] Appl. No.: 122,134

[22] Filed: Nov. 2, 1987

[30] Foreign Application Priority Data

Nov. 7, 1986 [JP] Japan ................................ 61-265275

[51] Int. Cl.$^5$ .............................................. C08K 3/00
[52] U.S. Cl. ...................................... 524/5; 524/560; 524/599

[58] Field of Search ............................ 524/560, 599, 5

[56] References Cited

U.S. PATENT DOCUMENTS

| | | | |
|---|---|---|---|
| 3,657,175 | 4/1972 | Zimmerman | 524/599 |
| 3,943,083 | 3/1976 | Adams et al. | 524/599 X |
| 4,762,867 | 8/1988 | Flodin et al. | 524/560 X |

*Primary Examiner*—Joseph L. Schofer
*Assistant Examiner*—J. M. Redd
*Attorney, Agent, or Firm*—Kalish & Gilster

[57] ABSTRACT

A pressure water absorption inhibitor for lightweight aggregates which comprises an aqueous dispersion of a polymeric substance having a viscosity which permits the aqueous dispersion to enter the fine pores in the surface layer of a lightweight aggregate and which dispersion is capable of being thickened to a viscosity of not less than 50 times the viscosity before thickening by elevation of the pH.

7 Claims, 4 Drawing Sheets

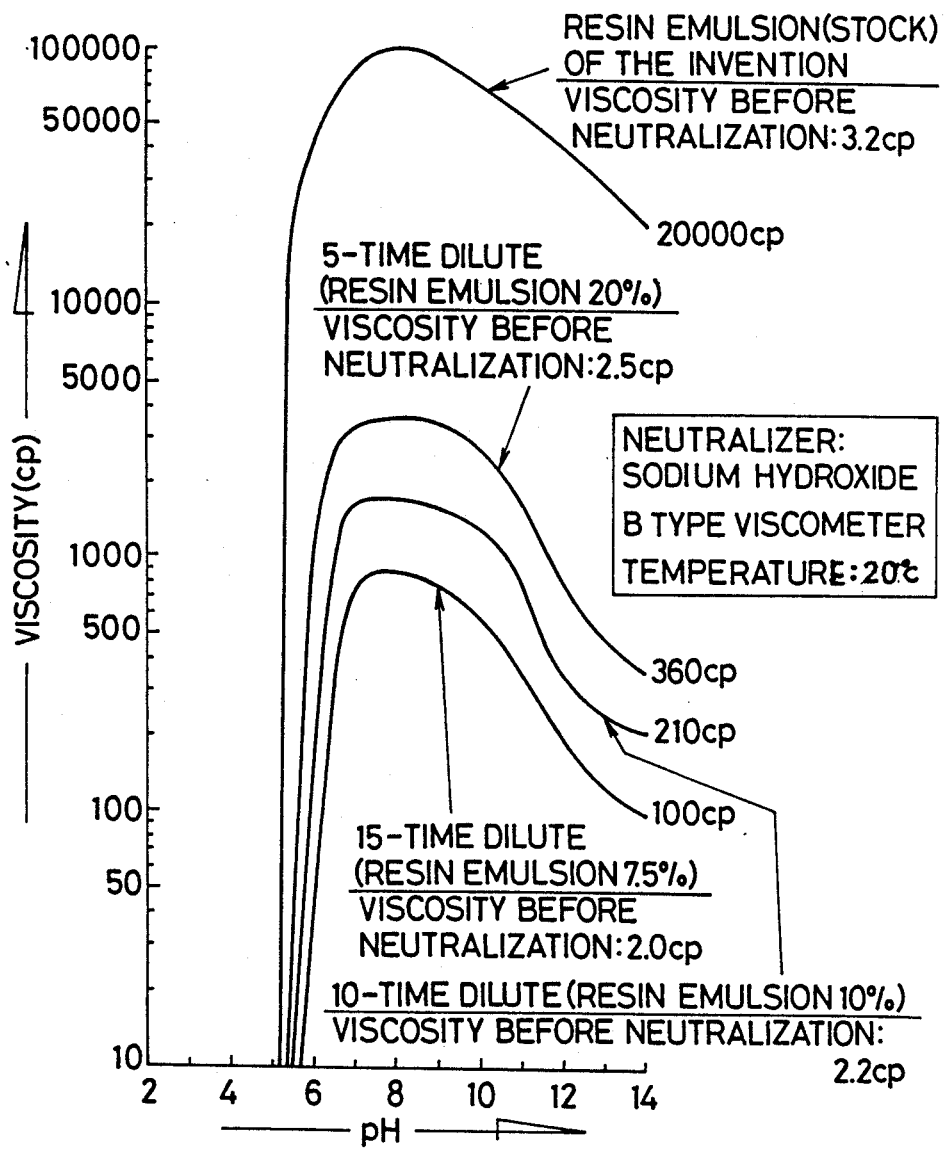

SUPPRESSION OF PRESSURE WATER ABSORPTION OF LIGHTWEIGHT AGGREGATE BY AQUEOUS DISPERSION THEREIN OF ANIONIC POLYMERS

DETAILED DESCRIPTION OF THE INVENTION

The present invention relates to a pressure water absorption inhibitor for lightweight aggregates and, more particularly, a pressure water absorption suppressing treatment which is effective for suppressing the pressure water absorption of lightweight aggregates during placing lightweight concrete by pumping.

As the techniques for suppressing the pressure water absorption of lightweight aggregates, (1) asphalt coating, (2) coating with a thermosetting resin such as an epoxy resin, (3) coating with an elastic resin such as urethane, (4) SBR (emulsion) coating, and (5) coating with a thickened cement paste (or mortar) using a water soluble polymer have conventionally been proposed.

These techniques conventionally proposed are, however, involve various problems: for example, the pressure water absorption suppressing action is lost under a high pressure (30 to 40 kg/cm$^2$) applied, for example, at the time of placing lightweight concrete by pumping (in the case of (1)); the adhesion between the lightweight aggregate and the mortar portion is lowered, thereby reducing the strength of the concrete (in the case of (2); transmittance of the stress from the lightweight aggregate to the mortar is not smooth, thereby reducing the strength of the concrete (in the case of (3); the pressure water absorption suppressing action is weak (in the case of (4)); and the coating is damaged by a physical or mechanical action during mixing the concrete, thereby losing the pressure water absorption suppressing action (in the case of (5)); and they cannot therefore be said to be suitable for practical use.

Accordingly, it is one object of the present invention to obtain a pressure water absorption inhibitor for lightweight aggregate, and it is an another object of the present invention to eliminate the above-described problems in the prior art and to provide a technique which suppresses the pressure water absorption at the time of pumping lightweight concrete without exerting a deleterious influence on the mechanical characteristics of the concrete or the workability.

BRIEF DESCRIPTION OF THE DRAWINGS

FIG. 2 is a graph showing the relationship between the viscosities and the pHs of a pressure water absorption inhibitor;

Figure 1:
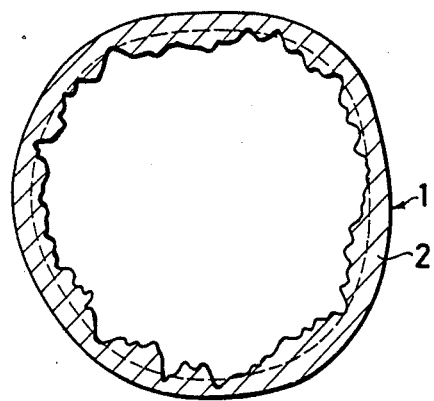
FIG. 1 is a sectional view of a lightweight aggregate on which the treatment in accordance with the present invention has been performed.

A pressure water absorption inhibitor according to the present invention is composed of an aqueous dispersion of a polymeric substance which has a lower viscosity enough to enter the fine pores in the surface layer of a lightweight aggregate, and can be thickened to a viscosity at least 50 times the original viscosity by raising the pH.

The aqueous dispersion of a polymeric substance constituting a pressurized water absorption inhibitor of the present invention is not specifically restricted so long as it can enter the fine pores in the surface layer of a lightweight aggregate and can be thickened to a predetermined viscosity by the rise in the pH.

Preferred polymeric substances are those which enable their aqueous dispersions to enter the fine pores in the surface layer of a lightweight aggregate at a comparatively low viscosity (preferably not more than 50 cp (centipoise), more preferably not more than 30 cp), and which can be thickened in the fine pores to a viscosity (cp at 20° C.) of not less than 50 times, preferable not less than 80 times, more preferably not less than 300 times the initial viscosity. The viscosity after the thickening is generally not less than 100 cp, preferably not less than 300 cp, more preferably not less than 1,000 cp.

As examples of such a polymeric substance which can be thickened to a predetermined thickness in the fine pores, anionic polymers composed of carboxyl group containing monomers (a) and if necessary other monomers (b) will be cited. As the monomer (a), unsaturated monocarboxylic acids such as (meth) acrylic acid [representing acrylic acid and methacrylic acid, and similar representation will be used hereinunder] and crotonic acid; and unsaturated polycarboxylic acids such as maleic acid, itaconic acid, fumaric acid are usable. As other monomer (b), the following examples will be cited: (1) unsaturated carboxylic acid esters, for example, an alkyl ester [methyl-, ethyl-, n-, iso-propyl, n-, iso-butyl, 2-ethylhexyl ester, etc.] having 1 to 12 carbon atoms of the above-described unsaturated carboxylic acids [(meth)acrylic acid, etc]; (2) aromatic vinyl monomers such as styrene; (3) vinyl esters such as vinyl acetate; (4) unsaturated nitriles such as (meth)acrylonitrile; (5) halogen containing monomers such as vinyl chloride and chloroprene. The monomers cited in (1) to (5) are all hydrophobic monomers. It will be also cited hydrophilic monomers, e.g., amide group containing monomers such as (meth)acrylamide, hydroxyl group containing monomers such as vinyl alcohol, (meth)allyl alcohol and hydroxyethyl (meth)acylate, di- or poly-vinyl compounds, e.g., divinyltoluene, and also it may be cited; di- or poly-esters of unsaturated mono- or poly-caroboxylic acid and polyol, polyethylene glycol diacrylate, di- or poly-(meth)allyl esters of polycarboxylic acid, diallyl maleate, diallyl phthalate and bis(meth)acrylamide; and other cross-linkable monomers having at least two polymerizable double bonds such as those described in U.S. Pat. No. 4,076,663. The ratio of these monomers in the polymer is varied in the range which allows the formation of a water-soluble or water-dispersing polymer. Generally, the carboxyl group containing monomer (a) is ordinarily not less than 20%, preferably 25 to 75%, more preferably 30 to 70%, the hydrophobic monomer is ordinarily not more than 80%, preferably 25 to 75%, more preferably 30 to 70%, and the cross-linkable monomer is ordinarily not more than 2%, preferably not more than 1%, each based on the weight of the total monomers. The weight ratio of the carboxyl group containing monomer (a) and other hydrophilic monomers is ordinarily 100:0 to 50:50, preferably 100:0 to 75:25.

An anionic polymer can be produced by polymerizing these monomers by an ordinary polymerizing method. In other words, it is produced by a known polymerizing technique such as bulk polymerization, solution polymerization, emulsion (or suspension) polymerization, and reverse layer (W/O) emulsion (or suspension) polymerization by using a polymerization catalyst (persulfate, peroxide, redox catalyst, etc.), ultraviolet rays, radiation, etc. Preferably, it is produced by emulsion polymerization by using a polymerization catalyst, in particular, a redox catalyst.

The acid value of an anionic polymer (as pure polymer) obtained in this way is ordinarily 100 to 500, preferably 200 to 450.

Among these anionic polymers, a vinyl polymer (emulsion) having the acid value described in Japanese Patent Laid-Open No. 210555/1985 is preferable. In particular, an anionic acrylic resin is preferable which has a (meth)acrylic acid unit represented by the following general formula (1) and a (meth)acrylic ester unit represented by the following general formula (2):

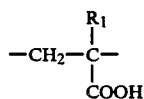 (1)

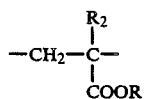 (2)

wherein $R_1$ represents H or $CH_3$, preferably $CH_3$, $R_2$ represents H or $CH_3$, preferably H, and R represents an alkyl group, preferably an alkyl group having 1 to 4 carbon atoms.

The molecular weight of such a aqueous dispersing polymer is ordinarily not less than 100,000. If the molecular weight is too low, the pressure water absorption suppressing action is unfavorably insufficient.

When such a polymeric aqueous dispersion is absorbed in the pores in the surface layer of a lightweight aggregate, the solid content of the aqueous dispersion is ordinarily 1 to 50%, preferably 2 to 30%.

The anionic polymer (aqueous dispersion) is emulsified and dispersed in the water as the particles having a diameter of 0.1 to 3 μm in an acid region (ordinarily, pH is not more than 5.5), and the dispersion (emulsion) with the polymer added thereto has a low viscosity (ordinarily 1 to 50 cp, preferably 1 to 30 cp). By increasing the pH to a neutral or alkaline region (ordinarily, pH is 6 to 13, preferably 7 to 10), the viscosity of the dispersion can be increased to not less than 50 times, preferably not less than 80 times, more preferably not less than 300 times as large as the viscosity before raising the pH. After the thickening, the viscosity generally becomes as high as not less than 100 cp, preferably not less than 300 cp, more preferably not less than 1,000 cp.

Accordingly, it is possible to produce the lightweight aggregates having suppressed absorbability of high pressure water, by raising the pH of the water consisting of such an acidic polymer in the pores in the surface layer of the aggregate.

The viscosity of the aqueous dispersion containing an anionic polymer is controlled by adjusting the pH, and in order to raise the pH to neutrality or alkalinity, it is preferable to utilize the $OH^-$ ions released from cement when it contacts with water. When cement comes into contact with water, $Ca(OH)_2$ is formed by the reaction of the free lime (CaO) with water or by the hydration of $C_3S$ (alite) or $C_2S$ (belite) in the cement, and the pH of the water is raised. Simultaneously, the reaction such as the following reaction between $K_2SO_4$ or $Na_2SO_4$ with $C_3A$ in the cement further raises the pH:

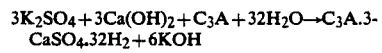

In order to increase the viscosity of the aqueous dispersion in the pores in the surface layer by 50 times or more, other methods than the above described the pH control method may be adopted. For example, a method of causing an aqueous solution or aqueous dispersion of a low viscosity resin material [monomers, partial polymers (such as olygomers and prepolymers) etc.] to permeate into the pores in the surface layer of aggregates, and thereafter polymerizing them in situ in the pores to form an aqueous layer having a viscosity 50 times or more larger than that before the polymerization may be adopted.

The inhibitor according to the present invention is applicable to artificial and natural lightweight aggregates which have conventionally been used for the manufacture of a lightweight concrete. They are described in, for example, at pp. 274 to 293 of "Handbook of Building Materials and Construction Methed" (published by Chijin Shokan on Apr. 10, 1969) and at pp. 327 to 350 "Handbook of Construction Materials" (published by Sankaido on Oct. 30, 1968). For example, they are artificial lightweight aggregates such as expanded shales (non-granulated type such as Mesalite, Asanolite and seilite; granulated type such as Bilton and Lionite; and crushed type such as Haydite), granulated type expanded clays (e.g. Keramsite and Leca), crushed type expanded slate, and granulated type burnt fly ash (Jolite, Laidac, Aglite, etc.); and natural lightweight aggregate such as lapilli (Oshima lapilli, Asama lapilli, etc.). Among these, artificial lightweight aggregates such as expanded shales (non-granulated type such as Mesilite, Asanolite and seilite; granulated type such as Bilton and Lionite; and crushed type such as Haydite), granulated type expanded clays (e.g. Keramsite and Leca), crushed type expanded slate, and granulated type burnt fly ash (Jolite, Laidac and Aglite, etc.) are preferable.

Such lightweight aggregates have fine pores in the surface layer. The pore is generally as fine as about 0.1 to 100 μm in diameter.

As a method for absorbing the aqueous dispersion in the pores in the surface layer of a lightweight aggregate by applying thereto the inhibitor according to the present invention, the following methods may be adopted:

(1) a method of mixing a pressure water absorption inhibitor (for example, aqueous dispersion containing the above-described acidic anionic polymer, and having a viscosity of not more than 50 cp) with a dried lightweight aggregate;

(2) a method of immersing a lightweight aggregate in an aqueous dispersion of the inhibitor of the present invention;

(3) a method of causing the inhibitor of the present invention to be sucked in a lightweight aggregate in a sealed container under a reduced pressure; and (4) a method of immersing a lightweight aggregate in inhibitor dispersion of the present invention and pressurizing with air, etc. to absorb.

Among these, method (1) is preferable.

As a method for thickening the inhibitor according to the present invention which has been absorbed in the pores in the surface layer of a lightweight aggregate in this way to a viscosity 50 times as large as that before thickening by raising the pH thereof, the following methods may be adopted:

(i) a method of raising the pH by the alkali of cement;
(ii) a method of raising the pH by the hydroxide and/or the carbonate of alkali metals (e.g., sodium hydroxide and potassium hydroxide);
(iii) a method of raising the pH by the hydroxide of a polyvalent metal (such as alkali earth metal and aluminum), for example calcium hydroxide, magnesium hydroxide, aluminium hydroxide.
(iv) a method of raising the pH by an aluminate (e.g., sodium aluminate and potassium aluminate);
(v) a method of raising the pH by ammonium hydroxide; and
(vi) a method of raising the pH by compounds which release $OH^-$ ions in the state of an aqueous solution or water dispersion. Among these, method (i) is preferable.

A treatment of a lightweight aggregate with inhibitor of the present invention can be carried out simultaneously with the mixing operation of concrete in a ready-mixed concrete plant.

The following flow sheet shows an example of a method of treating a lightweight aggregate with the inhibitor of the present invention in a ready-mixed concrete plant. A lightweight aggregate (artificial lightweight coarse aggregate) (10) and a pressure water absorption inhibitor (11) (aqueous dispersion) having a viscosity of not more than 50 cp, and containing the above-described acidic anionic polymer) are first charged into a mixer, the amount of inhibitor (11) being a necessary amount for being absorbed in the surface layer of the lightweight aggregate (10), the mixture is stirred so that the inhibitor (11) is absorbed in the surface layer of the lightweight aggregate (10) during this time, the remaining aggregate (sand) (12), and the water (13) (the amount of this water corresponds to the amount of remaining water obtained subtracting the amount of water in the inhibitor (11) which has been absorbed in the surface layer of the lightweight aggregate from the total amount of water in which have to be formulated the concrete), cement (14) and an admixture (15) is then added. The concrete is mixed, and as a result, the pHs of the aqueous dispersion (13) in the concrete and the inhibitor (11) which has been absorbed in the pores in the surface layer are raised due to the $OH^-$ ions released from the cemnet, and the viscosity of the inhibitor (11) in the pores in the surface layer of the lightweight aggregate (10) is increased. Thus, the pressure water absorption suppressing treatment of the present invention is performed on the aggregate (10).

Flow sheet:

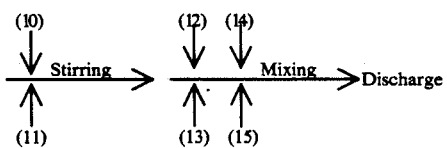

as shown in FIG. 1.

The lightweight aggregate 1 obtained by treating with the inhibitor of the present invention has a surface layer 2 formed an aqueous layer therein having a high viscosity (not less than 50 times the viscosity before thickening, generally not less than 100 cp) in the fine pores.

[Description of the Embodiments]

The present invention will now be explained with reference to the following examples, but it is not restricted thereto.

EXAMPLE 1

3% equivalent weight of a pressure water absorption inhibitor of the present invention composed of an anionic acrylic resin emulsion [ethyl acrylate/methacrylic acid (1/1 in the weight ratio) copolymer, acid value of 315 (as pure polymer) resin content of 25%, pH 2, viscosity of 3 cp (at 20° C.)] based on an artificial lightweight aggregate (Bilton, produced by Sumitomo Metal Mining Co., Ltd.) and the aggregate were charged into a mixer, and the materials were uniformly mixed for 15 seconds, and 2% of Portland cement based on the aggregate in the mixer was charged, all the materials being uniformly mixed for another 15 seconds. Thus, a lightweight aggregate was produced on which the pressure water absorption suppressing treatment in accordance with the present invention have been performed, and the obtained aggregate had an aqueous layer thickened to a viscosity of 100,000 cp (not less than 30,000 times the viscosity before thickening) in the pores in the surface layer.

The relationship between the viscosity and the pH of the inhibitor composed of the acrylic resin emulsion is shown in FIG. 2. [The relationships between the viscosities and the pHs of the aqueous dispersions obtained by diluting the above-described acrylic resin emulsion by 5 times, 10 times and 15 times, respectively, are also shown in FIG. 2].

Figure 3:
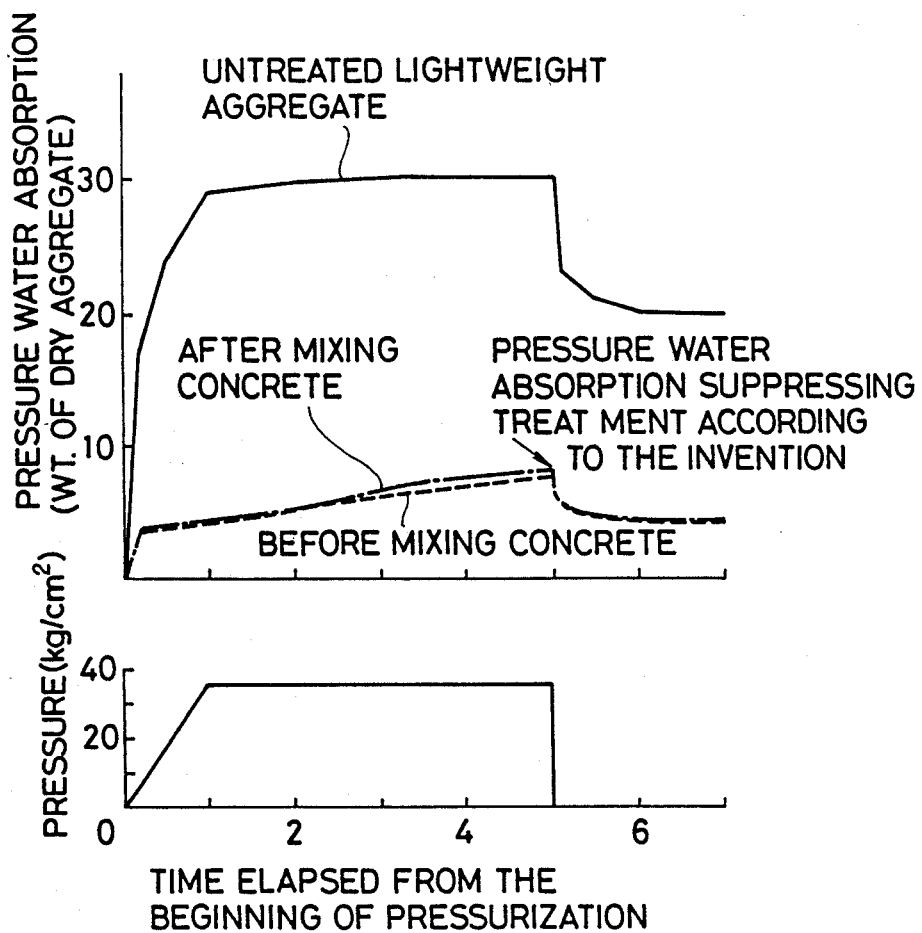
FIG. 3 shows the results of the pressure water absorbing tests carried out by using the lightweight aggregate on which the treatment of this invention has been performed and untreated ones.

The pressure water absorbing properties of a lightweight aggregate on which the pressure water absorption suppressing treatment by the above-described inhibitor had been performed and a lightweight aggregate without the suppressing treatment was examined by the following testing method. The results are shown in FIG. 3.

[Testing Method for Pressure Water Absorption Property]

Figure 4:
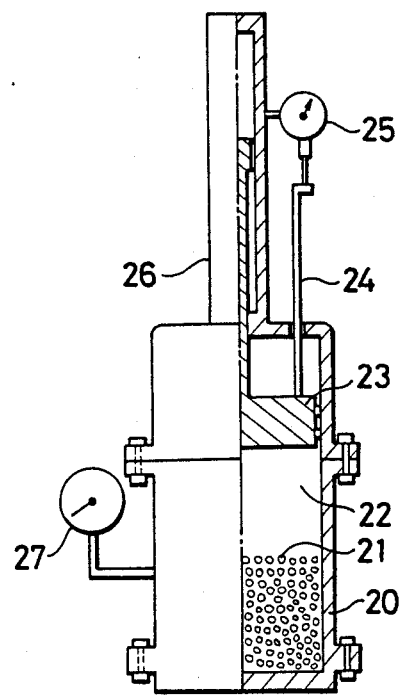
FIG. 4 is a sectional front view of the main part of a pressure water absorbing testing apparatus.

A testing apparatus is shown in FIG. 4. In FIG. 4, the reference numeral 20 denotes a pressure container having a sealed space. After a predetermined amount of lightweight aggregate is charged into the pressure container, the remaining space is filled with water. Thereafter, a plunger 23 is driven by a hydraulic jack 27 to apply a pressure to the water. The amount of displacement of the plunger 23 is measured by a dial gauge 25 through measuring rod 24 to obtain the amount of water pressure absorbed by a lightweight aggregate 21.

EXAMPLE 2

A treated lightweight aggregate was produced in the same way as in Example 1 except that the inhibitor of the present invention composed of an anionic acrylic resin emulsion [ethyl acrylate/methacrylic acid (6/4 in the weight ratio) copolymer, acid value of 260 (as pure polymer) resin content of 25%, pH 2, viscosity of 3 cp (at 20° C.)] was used in place of the acrylic resin emulsion in Example 1, and the water absorbing property was examined in the same way as in Example 1. The results were almost the same as those shown in FIG. 3.

COMPARATIVE EXAMPLE 1

A lightweight aggregate was coated with a paste (a viscosity of 100,000 cp at 20° C.) consisting of an aqueous solution of hydroxyethyl cellulose and an ordinary Portland cement in the same way as in Example 1, and was subjected to the pressure water absorption treatment.

Figure 5:
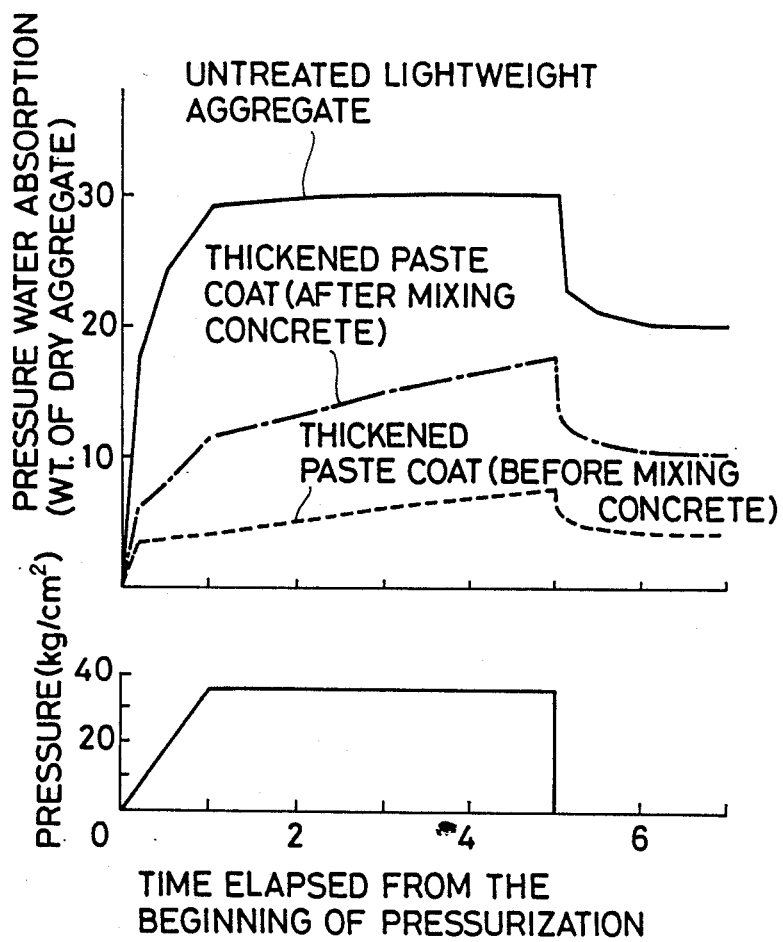
FIG. 5 shows the results of the pressure water absorbing tests the comparative lightweight aggregate (comparative Example 1) and the concrete using this lightweight aggregate.

FIG. 5 shows the results of the pressure water absorbing test of an aggregate on which the above-described treatment had been performed. In the pressure water absorbing test on the treaded aggregate alone, the pressure water absorption was greatly suppressed in comparison with the untreated aggregate. In a concrete produced from this aggregate, the coating was damaged by a mechanical action during mixing the concrete. Therefore, the pressure water absorbing suppressing action of the concrete produced was greatly lowered, as shown in FIG. 5. This phenomenon was not observed in the concrete, from the aggregates on which the treatment of the present invention had been performed, as shown in FIG. 3.

The placing tests of the concretes using these treated and untreated lightweight aggregates were carried out. The mix proportion of the concrete used in this experiment is shown in Table 1. These concretes were placed with 100 m carrying under pressure by using a piston type concrete pump (pipe diameter: 5 inch), and success or failure in placing, and the slumps and the compressive strengths before and after the placing were examined. The results are shown in Table 2.

In each of Examples 1 and 2, a slump down about 5 cm was observed, but placing was sufficiently possible, and almost no difference was observed in the strength between before and after the placing. In contrast, in the concrete using the untreated lightweight aggregate and the concrete using the lightweight aggregate treated by the method of Comparative Example 1, the pipe was stuffed up during the placing, which made the further placing impossible.

The placing tests of the concretes using these treated and untreated lightweight aggregates were carried out. The mix proportion of the concrete used in this experiment is shown in Table 1. These concretes were placed with 100 m carrying under pressure by using a piston type concrete pump (pipe diameter: 5 inch), and cussess or failure in placing, and the slumps and the compressive strengths before and after the placing were examined. The results are shown in Table 2.

In each of Examples 1 and 2, a slump down about 5 cm was observed, but placing was sufficiently possible, and almost no difference was observed in the strength between before and after the placing. In contrast, in the concrete using the untreated lightweight aggregate and the concrete using the lightweight aggregate treated by the method of Comparative Example 1, the pipe was stuffed up during the placing, which made the further placing impossible.

[Advantages of the Invention]

A lightweight aggregate treated with a pressure water absorption inhibitor of the present invention has an aqueous layer with a viscosity of not less than 1,000 cp in the pores of the surface layer. Such a lightweight aggregate is excellent in the pressure water absorption suppressing action in comparison with a conventional one, and the aqueous layer formed is capable of retaining the pressure water absorption suppressing action after mixing concrete without being influenced by the physical or mechanical action during the mixture of the concrete. In addition, since the coating layer is formed in the pores in the surface layer, there is no fear of the lowering of the adhesion between the lightweight aggregate and the mortar portion. Thus, the inhibitor of the present invention has a practically excellent abillity in the suppression of the pressure water absorption during the placing of a lightweight concrete by a pump.

It is possible to form an aqueous layer having a high viscosity in the fine pores on the surface layer of a lightweight aggregate by raising the viscosity of the aqueous dispersion after the absorption in accordance with the present invention. As a result, a lightweight aggregate having the above-described practically excellent ability in the suppression of the pressure water absorption is obtained.

The above-described control of the viscosity of the aqueous dispersion before and after absorbing in the fine pores can be easily achieved by using aqueous dispersion of an anionic polymer (in particular, an acrylic resin) added thereto and varying the pH thereof.

The above-described polymer is ordinarily, emulsified in the water as fine particles having a particle diameter of 0.1 to 3 μm in acidic conditions, and has such a low viscosity (about 1 to 3 cp) as to readily enter the

TABLE 1

| Maximun size of coarse aggregate (mm) | Water-cement ratio (%) | Sand-aggregate ratio (%) | Air content (%) | Unit content (kg/m³) | | | |
|---|---|---|---|---|---|---|---|
| | | | | Cement | Water | Coarse aggregate (Lightweight aggregate) | Fine aggregate (River sand) |
| 15 | 30 | 31 | 6 | 480 | 144 | 566 | 524 |

*A predetermined amount of air-entrained agent (Pozolis 202), High range water reducing agent (Pozolis NL 1450) and superplasticizer (Pozolis NP 20) were added.

TABLE 2

| | Slump (cm) | | Compressive strength (age: 28 days) (kg/cm²) | |
|---|---|---|---|---|
| | Before placing | After placing | Before placing | After placing |
| Untreated aggregate | 17.5 | Impossible of placing | 561 | — |
| Example 1 | 17.0 | 12.5 | 550 | 565 |
| Example 2 | 18.0 | 13.0 | 565 | 563 |
| Comparative Example 1 | 16.5 | Impossible of placing | 554 | — | fine pores. When the pH is raised to neutrality or alkalinity, the viscosity of the aqueous dispersion is increased to about several ten thousand cp due to the demulsification and dissolution of the polymer into the water, so that excellent pressure water absorption suppressing effect is performed. The adjustment of pH is readily carried out by the $OH^-$ ions released from the cement.

The treatment according to the present invention is very simple; no special treatment is necessary in the process of producing a lightweight aggregate and all the necessary operations can be carried out in the ready-mixed concrete plant.

A concrete using a lightweight aggregate which has been treated with the inhibitor of the present invention has a small degree of pressure water absorption during operating a pump and, hence, the lowering of the fluidity during the placing of the concrete is very small. Therefore, the pretreatment of the lightweight aggregate to absorb large amount of water and also marked dincrease of water loading to concrete become not necessary. That is, the use of the inhibitor of the present invention enables a lightweight concrete which is excellent in the freez-thaw durability and corrosion inhibition of a reinforcement to be efficiently worked by using a concrete pump.

We claim:

1. A lightweight aggregate which is inhibited for water absorption by pressure, the aggregate being treated with an aqueous polymer dispersion having a viscosity permitting the dispersion to enter fine pores in a surface layer of said aggregate by absorption, the dispersion so entered in the pores being thickenable by rise of pH and when so thickened having a viscosity of not less than 50 times the viscosity before thickening.

2. A lightweight aggregate according to claim 1 wherein the polymer has one or more carboxy groups.

3. A lightweight aggregate according to claim 1 wherein the polymer is an acidic anionic acrylic resin.

4. A lightweight aggregate in accordance with claim 3 wherein the acrylic resin is a methacryl acid/alkyl (meth) acrylate copolymer.

5. A lightweight aggregate according to claims 1 or 3 wherein the polymer has an initial viscosity of not more than 50 centipoise.

6. A lightweight aggregate according to claims 1 or 2 wherein said aqueous dispersion has an initial pH adequate for facile introduction into the fine pores in the surface layer of the lightweight aggregate and the viscosity of which may be increased to not less than 50 times the initial viscosity by elevating the pH of said dispersion to a neutral or alkaline region within said pores.

7. A lightweight aggregate according to claim 6 wherein cement is intermixed with said lightweight aggregate and said rise of the pH for viscosity thickening is provided by the hydroxyl ions released from the cement.

* * * * *